United States Patent
Kichise

(10) Patent No.: US 6,980,559 B2
(45) Date of Patent: Dec. 27, 2005

(54) NETWORK CONNECTION TECHNIQUE IN VOIP NETWORK SYSTEM

(75) Inventor: Miki Kichise, Tokyo (JP)

(73) Assignee: NEC Corporation, Tokyo (JP)

( * ) Notice: Subject to any disclaimer, the term of this patent is extended or adjusted under 35 U.S.C. 154(b) by 1156 days.

(21) Appl. No.: 09/829,971

(22) Filed: Apr. 11, 2001

(65) Prior Publication Data

US 2001/0030958 A1    Oct. 18, 2001

(30) Foreign Application Priority Data

Apr. 12, 2000 (JP) ............................. 2000-110661

(51) Int. Cl.$^7$ .................. H04L 12/28; H04L 12/56
(52) U.S. Cl. .................. 370/401; 370/352; 370/535; 370/536; 370/545
(58) Field of Search ................ 370/352, 401, 370/392, 432, 532, 533, 534, 535, 536, 537, 370/538, 539, 540, 541, 542, 543, 544, 545, 370/366, 467, 466; 790/224

(56) References Cited

U.S. PATENT DOCUMENTS

| | | | |
|---|---|---|---|
| 6,269,095 B1 * | 7/2001 | Neubauer et al. | 370/352 |
| 6,603,757 B1 * | 8/2003 | Locascio | 370/352 |
| 6,847,618 B2 * | 1/2005 | Laursen et al. | 370/261 |
| 6,856,613 B1 * | 2/2005 | Murphy | 370/352 |
| 2001/0024436 A1 * | 9/2001 | Barraclough et al. | 370/352 |
| 2005/0122985 A1 * | 6/2005 | Murphy | 370/401 |

FOREIGN PATENT DOCUMENTS

| | | |
|---|---|---|
| JP | 9-130429 | 5/1997 |
| JP | A 10-51480 | 2/1998 |
| JP | A 10-2100080 | 8/1998 |
| JP | A 11-220549 | 8/1999 |
| JP | A 11-275070 | 10/1999 |
| JP | A 2000-92119 | 3/2000 |
| JP | 2000-316021 | 11/2000 |
| JP | 2001-157183 | 6/2001 |
| JP | A 2002-521965 | 7/2002 |

OTHER PUBLICATIONS

H. Okazaki et al., "Network Solution Server," Nippon Electric Company, Ltd., NEC Technical Journal, V. 52, 1999, pp. 54-57, and 84.

* cited by examiner

Primary Examiner—Wellington Chin
Assistant Examiner—Chuong Ho
(74) Attorney, Agent, or Firm—Young & Thompson

(57) ABSTRACT

A network connection device allowing high-speed data conversion to ensure sufficiently high throughput is disclosed. The network connection device includes a plurality of conversion processors and a layer-4 switch. The layer-4 switch forwards an incoming IP packet to a selected one of the plurality of conversion processors depending on a result of analyzing the IP packet at layer 4. Therefore, the processing of data packet and the processing of control packet can be performed in parallel by the plurality of conversion processors, resulting in high-speed packet transfer.

15 Claims, 5 Drawing Sheets

NETWORK CONNECTION TECHNIQUE IN VOIP NETWORK SYSTEM

BACKGROUND OF THE INVENTION

1. Field of the Invention

The present invention relates to a network connection device connecting different types of networks, and in particular to a data conversion control technique of performing conversion between data on a switched telephone network and packets on an IP (Internet Protocol) network.

2. Description of the Related Art

There has been a data communications network composed of a plurality of switched telephone networks connected by IP networks, which is called a VoIP (Voice over IP) network. In such a VoIP network, a VoIP gateway device is provided between a switched telephone network and an IP network to perform protocol conversion. More specifically, the VoIP gateway device converts an IP packet stream received from the IP network to a data stream to be transmitted to the switched telephone network, and vice versa.

Since a packet stream received from the IP network is composed of control packets and data packets, the VoIP gateway device converts the received data packets to, for example, a voice data stream while processing the control packets. Therefore, if the processor of the VoIP gateway device has a low signal-processing capability, then it is difficult to perform conversion from data packets to a voice data stream without a hitch, increasing the possibility of loss of packet and thereby reducing the quality of service such as the quality of reproduced voice. To avoid such a reduction in quality of service, it is necessary to provide the VoIP gateway device with a high-speed processor to increase in throughput.

However, the processing speed of a program-controlled processor is limited. When high-speed processing is needed to process voice and video packets, there is a high possibility that the conversion is not smoothly performed and thereby some packets are discarded.

There have been proposed several Internet telephony techniques in Japanese Patent Application Unexamined Publication Nos. 10-210080, 11-220549, and 11-275070. However, none of these publications teach any technique of increasing in throughput so as not to reduce in quality of service.

SUMMARY OF THE INVENTION

An object of the present invention is to provide a network connection device and a data conversion control method allowing high-speed data conversion to ensure sufficiently high throughput.

According to the present invention, a network connection device for connecting an IP (Internet Protocol) network and a switched telephone network, includes: an IP network interface to the IP network; a line interface to the switched telephone network; a plurality of conversion processors, each of which performs conversion between data on the switched telephone network and an IP packet on the IP network; a layer-4 switch connected between the IP network interface and the plurality of conversion processors, for forwarding an IP packet received from the IP network interface to a selected one of the plurality of conversion processors depending on a result of analyzing the IP packet at layer 4; and a multiplexer for multiplexing data received from the plurality of conversion processors to output a data stream to the line interface.

The layer-4 switch may determine the selected one of the plurality of conversion processors depending on which one of a control packet and a data packet the IP packet is.

The layer-4 switch may determine the selected one of the plurality of conversion processors based on a source address, a UDP (User Datagram Protocol) header, and a RTP (Real-time Transport Protocol) header of the IP packet.

The plurality of conversion processors may include at least one data conversion processor dedicated to conversion of data packet and at least one control conversion processor dedicated to conversion of control packet. The layer-4 switch may forward an IP packet to a data conversion processor when the IP packet is a data packet, and forwards the IP packet to a control conversion processor when the IP packet is a control packet.

The multiplexer may demultiplex a data stream received from the line interface to transfer demultiplexed data to a selected one of the plurality of conversion processors depending on whether the demultiplexed data is control data. The plurality of conversion processors may include at least one data conversion processor dedicated to conversion of data packet and at least one control conversion processor dedicated to conversion of control packet. The layer-4 switch may receive packets from the plurality of conversion processors to transfer them to the IP network interface.

According to another aspect of the present invention, a control method for a network connection device connecting an IP (Internet Protocol) network and a switched telephone network, includes the steps of: a) analyzing an IP packet received from the IP network interface at layer 4; b) forwarding the IP packet to a selected one of the plurality of conversion processors depending on a result of the step (a); and c) converting the IP packet to data on the switched telephone network by the selected conversion processor.

The step (a) may be the step of determining the selected one of the plurality of conversion processors depending on which one of a control packet and a data packet the IP packet is.

The step (a) may include the steps of: determining whether a source address of the IP packet indicates a call agent; when the source address of the IP packet does not indicate the call agent, inspecting a UDP (User Datagram Protocol) header of the IP packet to determine whether a protocol type code of the IP packet indicates UDP; when the protocol type code of the IP packet indicates UDP, inspecting an RTP (Real-time Transport Protocol) header of the IP packet to determine whether a destination port number of the IP packet indicates an RTP port working on call connection; when the destination port number of the IP packet indicates an RTP port working on call connection, determining that the IP packet is forwarded to a conversion processor dedicated to conversion of data packet; and when the source address of the IP packet indicates the call agent, when the protocol type code of the IP packet does not indicate UDP, or when the destination port number of the IP packet does not indicate an RTP port working on call connection, determining that the IP packet is forwarded to a conversion processor dedicated to conversion of control packet.

The control method may further include the steps of: demultiplexing a data stream received from the line interface to produce demultiplexed data; and transferring the demultiplexed data to a selected one of the plurality of conversion processors depending on whether the demultiplexed data is control data.

According to still another aspect of the present invention, a network system includes: an IP (Internet Protocol) network; a switched telephone network including a service switching point; a SS7 (signaling system No. 7) gateway allowing the service switching point to exchange SS7 signals; a call agent; and a voice over IP (VoIP) gateway for connecting the IP network and the switched telephone network.

The VoIP gateway includes: an IP network interface to the IP network; a line interface to the switched telephone network; a plurality of conversion processors, each of which performs conversion between data on the switched telephone network and an IP packet on the IP network; a layer-4 switch connected between the IP network interface and the plurality of conversion processors, for forwarding an IF packet received from the IP network interface to a selected one of the plurality of conversion processors depending on a result of analyzing the IP packet at layer 4; and a multiplexer for multiplexing data received from the plurality of conversion processors to output a data stream to the line interface.

DESCRIPTION OF THE PREFERRED EMBODIMENT

Network Configuration

Figure 1:
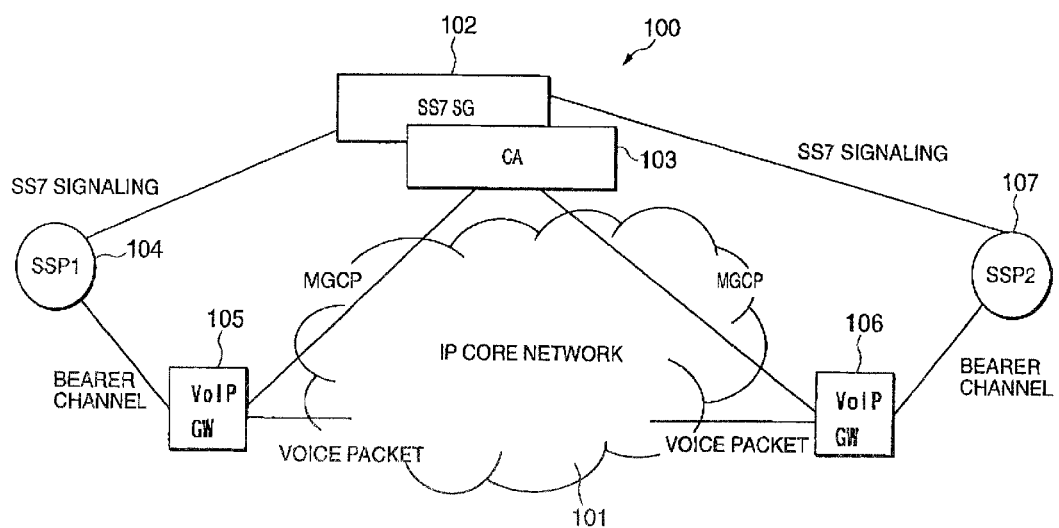
FIG. 1 is a diagram showing the configuration of a voice over IP (VoIP) network.

Referring to FIG. 1, it is assumed that a network 100 includes an IP core network 101, a SS7 (signaling system No. 7) gateway (SS7SG) 102, a call agent (CA) 103, a first service switching point (SSP1) 104, network connection devices (VoIP GW) 105 and 106, and a second service Switching point (SSP2), 107. Here, the IP core network 101 is connected to the first service switching point 104 of a first switched telephone network through the network connection device (VoIP GW) 105 and further to the second service switching point 107 of a second switched telephone network through the network connection device (VoIP GW) 106. A switched telephone network is typically a public switched telephone network (PSTN).

The SS7 gateway 102 is connected to both the first and second service switching points 104 and 107 to exchange SS7 signals. The call agent 103 communicates with the network connection devices 105 and 106 according to media gateway control protocol (MGCP). The first and second service switching points 104 and 107 communicate with respective ones of the network connection devices 105 and 106 through bearer channels.

Each of the network connection devices 105 and 106 is a VoIP gateway according to an embodiment of the present invention. The network connection device 105 connects the first service switching points 104 and the IP core network 101 and the network connection device 106 connects the second service switching points 107 and the IP core network 101.

Network Connection Device

Figure 2:
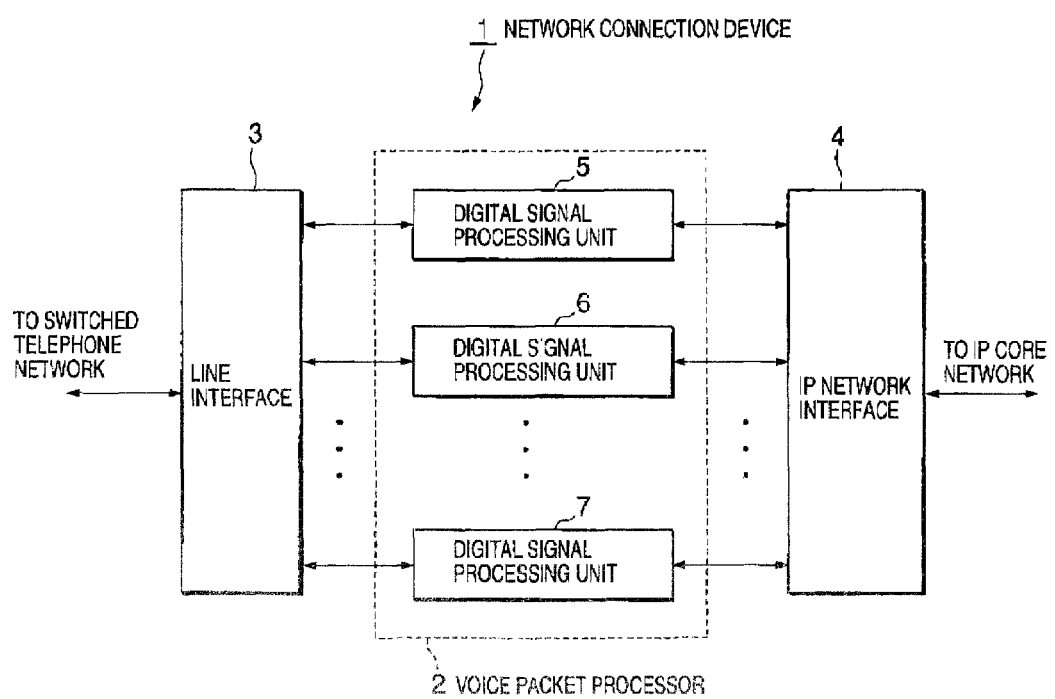
FIG. 2 is a block diagram showing the configuration of a network connection device according to an embodiment of the present invention.

Referring to FIG. 2, a network connection device 1 according to the embodiment of the present invention is provided with a voice packet processor 2 connected to a line interface 3 and an IP network interface 4. The line interface 3 is connected to a service switching point (104 or 107) of the switched telephone network. The IP network interface 4 is connected to the IP core network 101.

The voice packet processor 2 is composed of a plurality of digital signal processing units, each of which is connected to the line interface 3 and the IP network interface 4. Here, three digital signal processing units 5–7 are shown for simplicity but the number of digital signal processing units is determined depending on the amount of data processing in the service switching point connected thereto.

When receiving a data stream from the switched telephone network, the line interface 3 transfers it to the digital signal processing units 5–7. When receiving data streams from the digital signal processing units 5–7, the line interface 3 transfers them to the switched telephone network.

When receiving packets from the digital signal processing units 5–7, the IP network interface 4 transfers them to the IP core network. When receiving a data packet stream from the IP core network, the IP network interface 4 transfers it to the digital signal processing units 5–7. The IP network interface 4 performs predetermined protocol processing for transmitted and received packets.

Since the digital signal processing units 5–7 has the same internal circuit, it will be described taking the digital signal processing unit 5 as an example.

Figure 3:
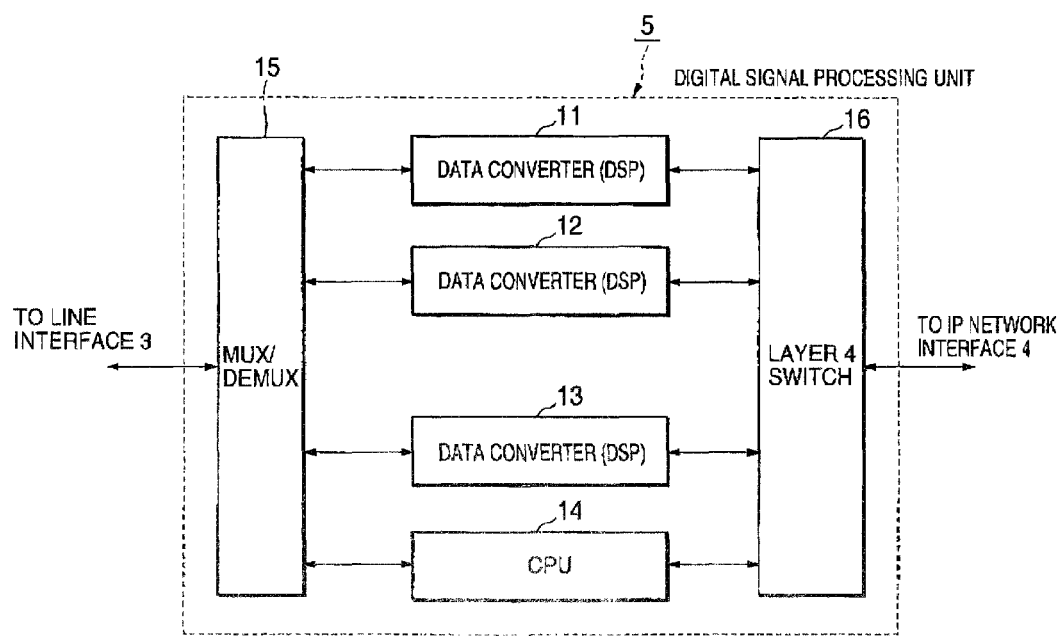
FIG. 3 is a block diagram showing a circuit of a digital signal processing unit performing conversion between data on the switch telephone network and packets on the IP network in the embodiment of FIG. 2.

Referring to FIG. 3, the digital signal processing unit 5 is composed of a plurality of conversion processors composed of data converters (here, three data converters 11–13) and a processor 14, a multiplexer 15, and a layer-4 switch 16. The multiplexer 15 is connected to the line Interface 3 and is further connected to the data converters 11–13 and the processor 14. The data converters 11–13 and the processor 14 are connected to the layer-4 switch 16, which is in turn connected to the IP network interface 4. Each of the data converters 11–13 is implemented by a digital signal processor (DSP) and the processor 14 is a central processing unit (CPU).

The multiplexer 15 performs multiplexing and demultiplexing, More specifically, the multiplexer 15 demultiplexes a data stream transferred from the line interface 3 into a plurality of pieces of data, which are classified under control information and information to be converted by a data converter. A piece of data to be converted is distributed to a selected one of the data converters 11–13 depending on the source thereof. Control data is transferred to the processor 14. On the other hand, when receiving voice data from the data converters 11–13 and control data from the processor 14, the multiplexer 15 multiplexes these data to produce a data stream, which is output from the multiplexer 15 to the line interface 3. The line interface 3 transmits the data stream to the service switching point of the switched telephone network through the bearer channel.

The data converters 11–13 and the processor 14 perform conversion between data on the switched telephone network and packets on the IP core network. The data converters 11–13 perform data processing related to voice data, image data, facsimile data, and modem data. The processor 14 performs data processing related to control data.

The layer-4 switch 16 performs protocol processing based on layer-4 information in the OSI model. When receiving a packet from the IP network interface 4, the layer-4 switch 16 inspects the packet at layer 4 and analyzes it. Based on the analysis result, the layer-4 switch 16 transfers it to a selected one of the data converters 11–13 and the processor 14. As described above, when the packet relates to voice, image, facsimile, and modem, it is transferred to one of the data converters 11–13. When the packet is a control packet, it is transferred to the processor 14.

The data converters 11–13 and the processor 14 perform data processing determined depending on what the received packet is to produce processed data. The processed data are output to the multiplexer 15, which multiplexes them to output a multiplexed data stream to the line interface 3.

Layer-4 Switch

Figure 4:
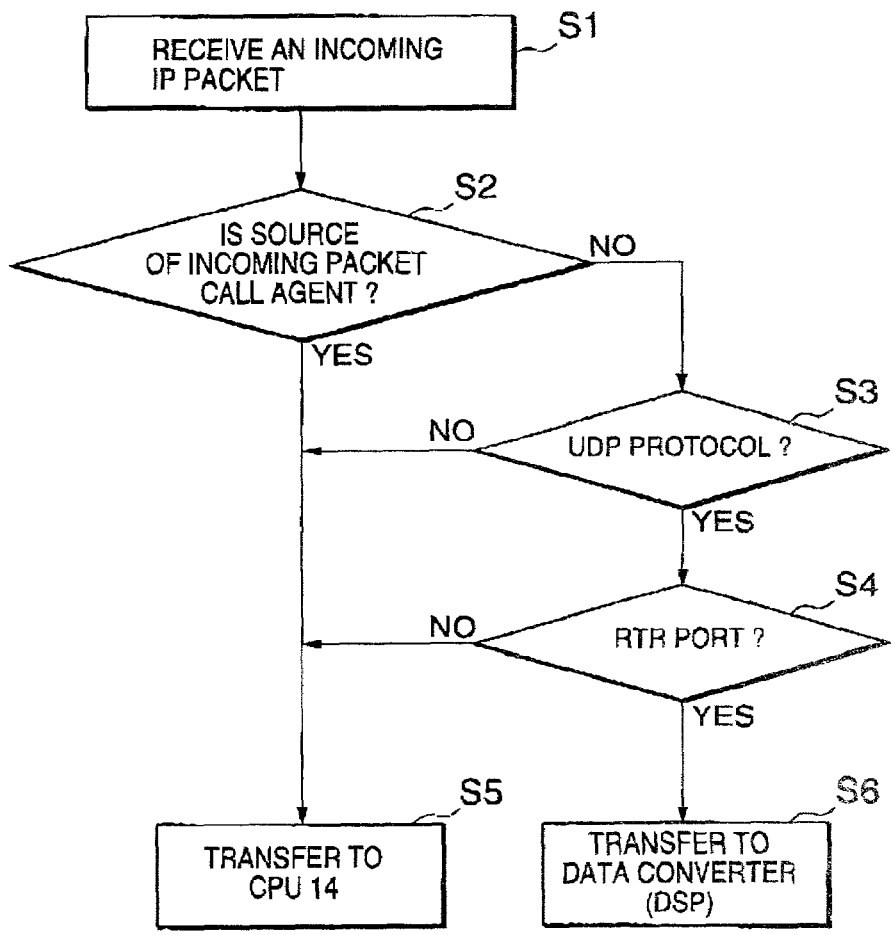
FIG. 4 is a flow chart showing an operation of a layer-4 switch employed in the digital signal processing unit of FIG. 3.

Referring to FIG. 4, when receiving an incoming IP packet (step S1), the layer-4 switch 16 analyzes the incoming IP packet at layer 4 and determines whether the source address of the incoming IP packet indicates the call agent 103 (step S2) the source of the incoming IP packet is the call agent 103 (YES at step S2), the IP packet is a MGCP (Media Gateway Control Protocol) packet and therefore is transferred to the processor 14 which terminates MGCP (step S5).

When the source of the incoming IP packet is not the call agent 103 (NO at step S2), the layer-4 switch 16 further determines whether its protocol type code is identical to "0x11", which indicates User Datagram Protocol (UDP) (step S3). If the protocol type code does not indicate UDP (NO at step S3), then the IP packet may be TCP (transmission Control Protocol) packet or ICMP (Internet Control Message Protocol) packet and therefore it is transferred to the processor 14 (step S5).

If the protocol type code indicates UDP (YES at step S3), then the layer-4 switch 16 analyzes the TCP segment header thereof to determine whether the destination port number in the TCP segment header indicates a RTP (Realtime Transport Protocol) port currently working on call connection (step S4). When the destination port number indicates the RTP port currently working on call connection (YES at step S4), the layer-4 switch 16 transfers the incoming packet to one of the data converters 11–13 (step S6). When the destination port number does not indicate the RTP port currently working on call connection (NO at step S4), the IP packet may be RTCP (Realtime Transport Control Protocol) packet and therefore it is transferred to the processor 14 (step S5). The packet transferred to one of the data converters 11–13 and the processor 14 is processed depending on data stored in the packet. In this manner, the packet analysis at layer 4 is performed.

The packet processed by the layer-4 switch 16 may be composed of IP header of 20 bytes or more, UDP header of 8 bytes or more, RTP header of 12 bytes or more, and encoded data of 10 to 160 bytes. The encoded data conforms to ITU-T standards such as G.711, G. 723, and G.729.

Since the layer-4 switch 16 is dedicated to packet analysis at layer 4, it is possible to transfer an incoming packet to one of the data converters 11–13 and the processor 14 at higher speeds, compared with the program-controlled processor of the prior art.

Data Converter

Since the data converters 11–13 has the same internal circuit, it will be described taking the data converter 11 as an example.

Figure 5:
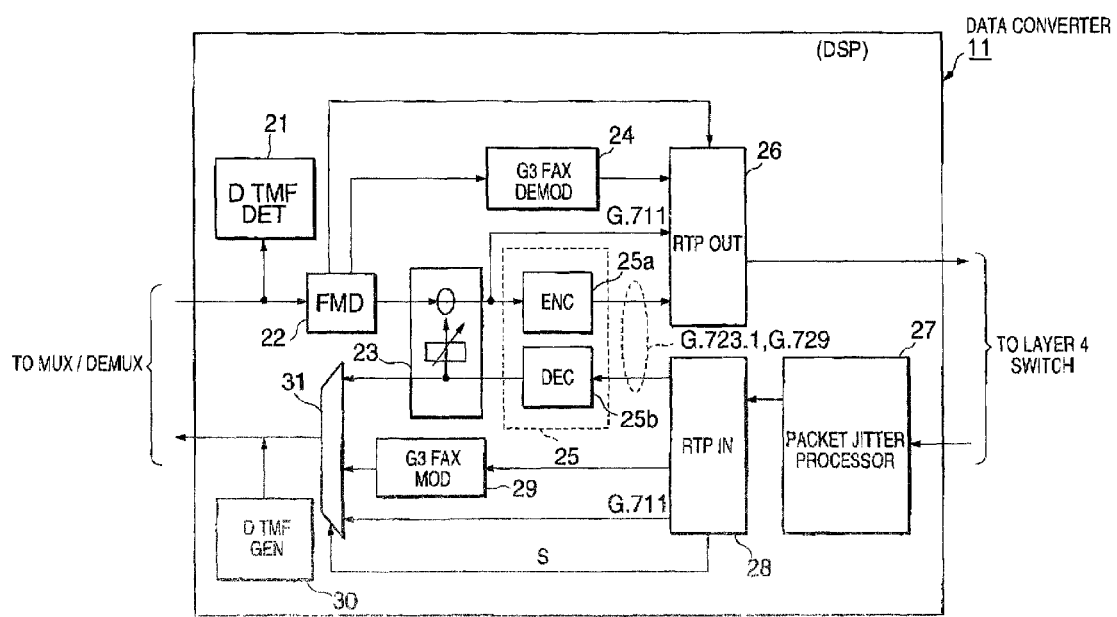
FIG. 5 is a block diagram showing a detailed circuit of a data converter in the digital signal processing unit of FIG. 3.

Referring to FIG. 5, the data converter 11 is connected between an input/output port of the multiplexer 15 and an input/output port of the layer-4 switch 16. The data converter 11 includes a DTMF (Dual-tone Multi-Frequency) detector 21, a frequency-modulation detector (FMD) 22, an echo canceller 23, a facsimile signal demodulator 24, a codec 25 including an encoder 25a and a decoder 25b, an RTP output section 26, a packet jitter processor 27, an RTP input section 28, a facsimile signal modulator 29, a DTMF generator 30, and a selector 31.

The DTMF detector 21 detects a DTMF signal from voice data received from the switched telephone network through the line interface 3 and the multiplexer 15. The frequency-modulation detector 22 detects a modem signal and a G3-facsimile signal from the voice data and transfers the modem signal directly to the RTP output section 26 and the G3-facsimile signal to the facsimile signal demodulator 24. The demodulated facsimile signal is output from the facsimile signal demodulator 24 to the RTP output section 26. The frequency-modulation detector 22 transfers a voice signal and an image or video signal to the echo canceller 23.

The echo canceller 23 eliminates an echo from the input signal and transfers a control signal conforming to, for example, G.711 standard to the RTP output section 26 and further transfers the signals other than the signal conforming to, for example, G.711 standard to the encoder 25a. The encoder 25a performs encoding of an input signal, conforming to, for example, G.723.1 or G.729 and outputs an encoded signal to the RTP output section 26. The RTP output section 26 produces packets from input signals and transfers packets to the layer-4 switch 16.

The packet jitter processor 27 receives an IP packet from the IP core network 101 through the IP network interface 4 and the layer-4 switch 16 and corrects a fluctuation in the received IP packet. The jitter-corrected packet is output to the RTP input section 28. It is not necessary to provide a packet jitter processor in each of the data converters 11–13. It may be provided in the output stage of the layer-4 switch 16. In this case, the digital signal processing unit can reduce in the amount of hardware because the digital signal processing unit is not needed to be provided with a plurality of packet jitter processors.

The RTP input section 28 converts the received IP packet to a corresponding one of voice data, facsimile data, and control data. The RTP input section 28 outputs the voice data conforming to G.723.1 or G.729 to the decoder 25b, the facsimile data to the facsimile signal modulator 29, and the control data conforming to G.711 to the selector 31. In addition, the RTP input section 28 outputs a selection signal S corresponding to the type of data to the selector 31.

The decoder 25b performs decoding of voice data conforming to G.723.1 or G.729 and outputs a decoded voice signal to the echo canceller 23. The echo canceller 23 generates a replica to be used for echo cancellation from the decoded voice signal and transfers the decoded voice signal to the selector 31. The facsimile signal modulator 29 modulates the facsimile data to produce a facsimile signal and outputs it to the selector 31.

The selector 31 selects one of the decoded voice signal, the facsimile signal, and the control data conforming to G.711 depending on the selection signal S. A selected signal of the selector 31 is combined with a DTMF signal generated by the DTMF generator 30 and the signal combined with the DTMF signal is transferred to the multiplexer 15.

An encoding/decoding system employed in the data converter is not limited to the above embodiment. Other systems may be employed. In the case of encoding/decoding of image data, for example, JPEG (Joint Photographic Experts Group) or MPEG (Moving Picture Experts Group) may be employed.

In the embodiment, each of the digital signal processing units 5–7 is composed of a plurality of data converters 11–13 and a single processor 14. Alternatively, it is possible to provide each digital signal processing unit with a plurality of data converters and a plurality of processors.

As described above, the layer-4 switch is provided to analyze packets at layer 4 and distributes each packet to a selected one of a plurality of conversion processors depending on the analysis result. Therefore, the processing of data packet and the processing of control packet can be performed in parallel by the plurality of conversion processors. In other words, the layer-4 analysis and the processing of control packet are separately performed, resulting in high-speed packet transfer. Therefore, the speed of transferring voice packets to data converters is increased, improving the throughput of the network connection device.

What is claimed is:

1. A network connection device for connecting an IP (Internet Protocol) network and a switched telephone network, comprising:
   an IP network interface to the IP network;
   a line interface to the switched telephone network;
   a plurality of conversion processors, each of which performs conversion between data on the switched telephone network and an IP packet on the IP network;
   a layer-4 switch connected between the IP network interface and the plurality of conversion processors, for forwarding an IP packet received from the IP network interface to a selected one of the plurality of conversion processors depending on a result of analyzing the IP packet at layer 4; and
   a multiplexer for multiplexing data received from the plurality of conversion processors to output a data stream to the line interface.

2. The network connection device according to claim 1, wherein the layer-4 switch determines the selected one of the plurality of conversion processors depending on which one of a control packet and a data packet the IP packet is.

3. The network connection device according to claim 1, wherein the layer-4 switch determines the selected one of the plurality of conversion processors based on a source address, a UDP (User Datagram Protocol) header, and a RTP (Real-time Transport Protocol) header of the IP packet.

4. The network connection device according to claim 1, wherein the plurality of conversion processors include at least one data conversion processor dedicated to conversion of data packet and at least one control conversion processor dedicated to conversion of control packet.

5. The network connection device according to claim 4, wherein the layer-4 switch forwards an IP packet to a data conversion processor when the IP packet is a data packet, and forwards the IP packet to a control conversion processor when the IP packet is a control packet.

6. The network connection device according to claim 1, wherein the multiplexer demultiplexes a data stream received from the line interface to transfer demultiplexed data to a selected one of the plurality of conversion processors depending on whether the demultiplexed data is control data.

7. The network connection device according to claim 6, wherein the plurality of conversion processors include at least one data conversion processor dedicated to conversion of data packet and at least one control conversion processor dedicated to conversion of control packet.

8. The network connection device according to claim 6, wherein the layer-4 switch receives packets from the plurality of conversion processors to transfer them to the IP network interface.

9. A control method for a network connection device connecting an IP (Internet Protocol) network and a switched telephone network, the network connection device comprising:
   an IP network interface to the IP network;
   a line interface to the switched telephone network; and
   a plurality of conversion processors, each of which performs conversion between data on the switched telephone network and an IP packet on the IP network,
   the method comprising the steps of:
   a) analyzing an IP packet received from the IP network interface at layer 4;
   b) forwarding the IP packet to a selected one of the plurality of conversion processors depending on a result of the step (a); and
   c) converting the IP packet to data on the switched telephone network by the selected conversion processor.

10. The control method according to claim 9, wherein the step (a) comprises the step of determining the selected one of the plurality of conversion processors depending on which one of a control packet and a data packet the IP packet is.

11. The control method according to claim 10, wherein the step (a) comprises the steps of:
   determining whether a source address of the IP packet indicates a call agent;
   when the source address of the IP packet does not indicate the call agent, inspecting a UDP (User Datagram Protocol) header of the IP packet to determine whether a protocol type code of the IP packet indicates UDP;
   when the protocol type code of the IP packet indicates UDP, inspecting an RTP (Real-time Transport Protocol) header of the IP packet to determine whether a destination port number of the IP packet indicates an RTP port working on call connection;
   when the destination port number of the IP packet indicates an RTP port working on call connection, determining that the IP packet is forwarded to a conversion processor dedicated to conversion of data packet; and
   when the source address of the IP packet indicates the call agent, when the protocol type code of the IP packet does not indicate UDP, or when the destination port number of the IP packet does not indicate an RTP port working on call connection, determining that the IP packet is forwarded to a conversion processor dedicated to conversion of control packet.

12. The control method according to claim 10, further comprising the steps of:
   demultiplexing a data stream received from the line interface to produce demultiplexed data; and
   transferring the demultiplexed data to a selected one of the plurality of conversion processors depending on whether the demultiplexed data is control data.

13. A network system comprising:
   an IP (Internet Protocol) network;
   a switched telephone network including a service switching point;

a SS7 (signaling system No. 7) gateway allowing the service switching point to exchange SS7 signals;

a call agent; and a voice over IP (VoIP) gateway for connecting the IP network and the switched telephone network, wherein the VoIP gateway comprises:

an IP network interface to the IP network;

a line interface to the switched telephone network;

a plurality of conversion processors, each of which performs conversion between data on the switched telephone network and an IP packet on the IP network;

a layer-4 switch connected between the IP network interface and the plurality of conversion processors, for forwarding an IP packet received from the IP network interface to a selected one of the plurality of conversion processors depending on a result of analyzing the IP packet at layer 4; and a multiplexer for multiplexing data received from the plurality of conversion processors to output a data stream to the line interface.

14. The network system according to claim 13, wherein the plurality of conversion processors include at least one data conversion processor dedicated to conversion of data packet and at least one control conversion processor dedicated to conversion of control packet.

15. The network system according to claim 14, wherein the layer-4 switch forwards an IP packet to a data conversion processor when the IP packet is a data packet, and forwards the IP packet to a control conversion processor when the IP packet is a control packet.

* * * * *